Figure 3:
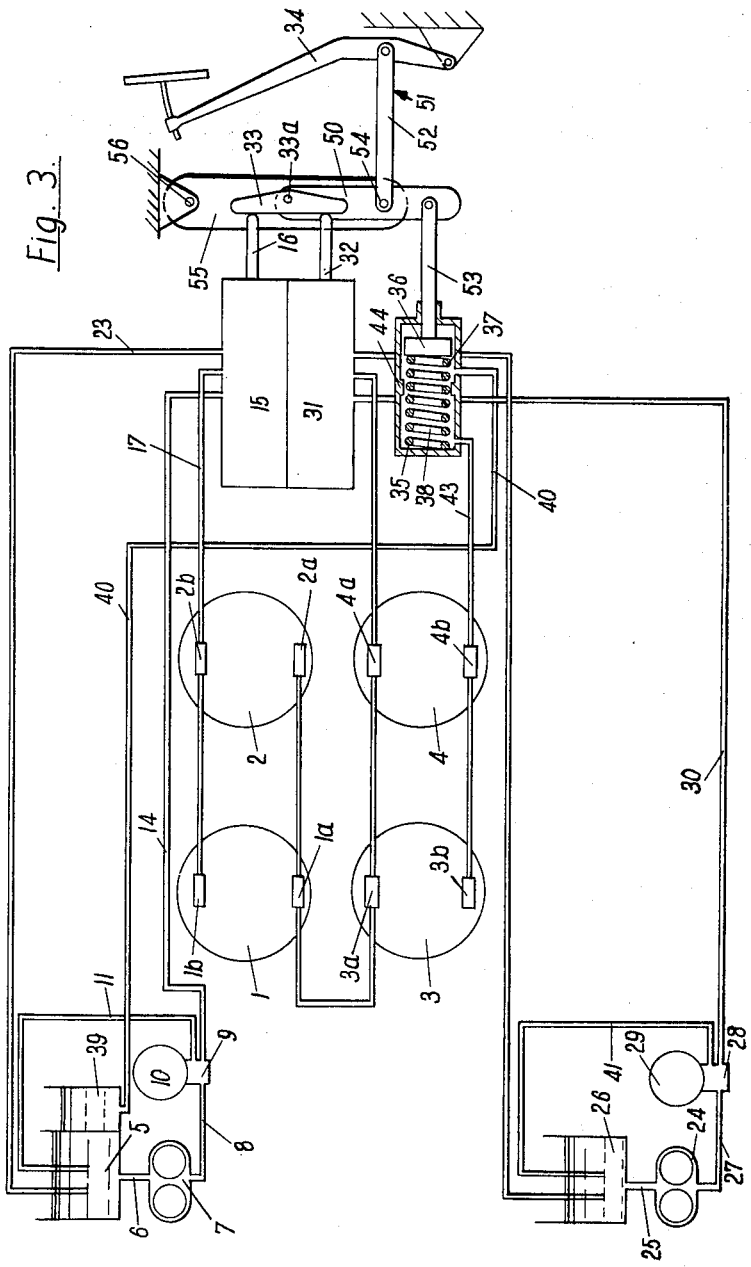

May 10, 1966  B. R. SHILTON  3,250,575
HYDRAULIC BRAKING SYSTEMS FOR VEHICLES
Filed April 3, 1964  2 Sheets-Sheet 1
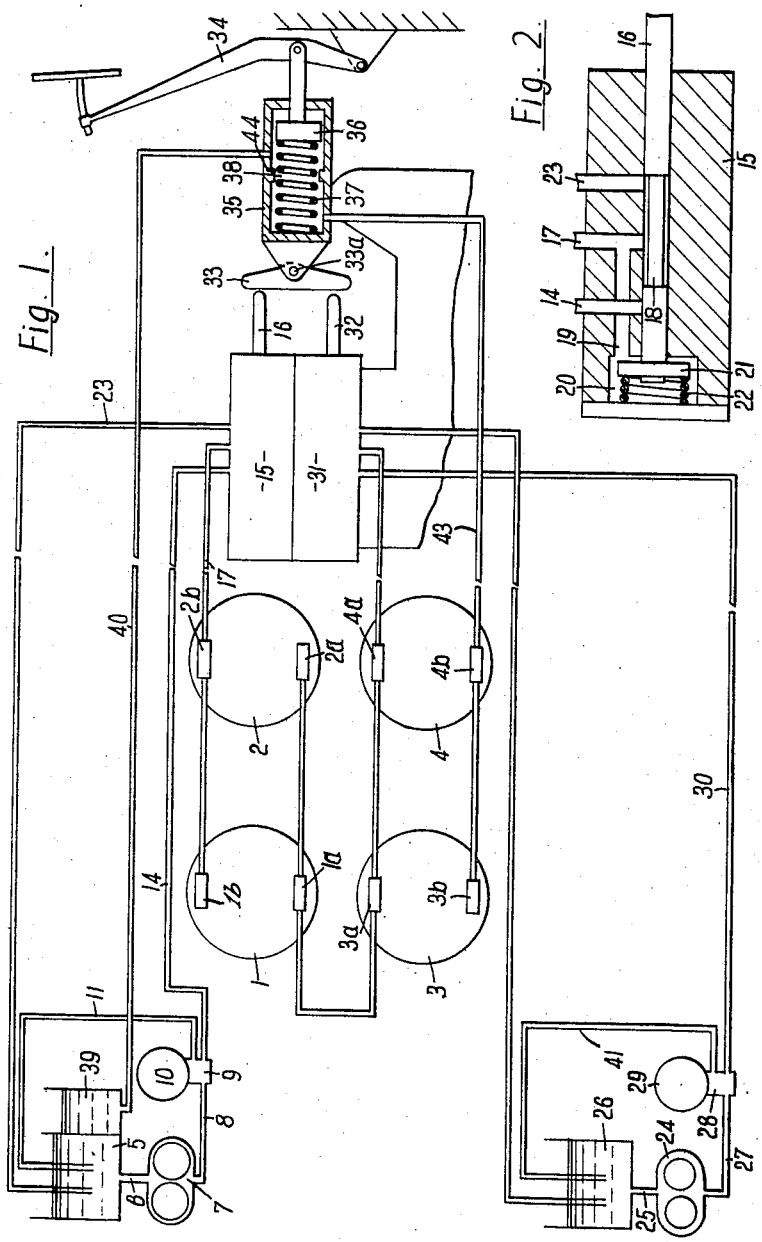
Inventor
Brian Roger Shilton
By Cushman, Darby & Cushman
Attorneys May 10, 1966  B. R. SHILTON  3,250,575
HYDRAULIC BRAKING SYSTEMS FOR VEHICLES
Filed April 3, 1964  2 Sheets-Sheet 2

Inventor
Brian Roger Shilton
By Cushman, Darby & Cushman
Attorneys

United States Patent Office 3,250,575
Patented May 10, 1966

3,250,575
HYDRAULIC BRAKING SYSTEMS FOR VEHICLES
Brian Roger Shilton, Crewe, England, assignor to Rolls-Royce Limited, Derby, England, a British company
Filed Apr. 3, 1964, Ser. No. 357,168
Claims priority, application Great Britain, Apr. 29, 1963, 16,843/63
5 Claims. (Cl. 303—2)

This invention concerns hydraulic braking systems for vehicles.

According to the present invention there is provided a hydraulic braking system for vehicles comprising a plurality of brakes adapted to be applied to wheels of said vehicle, an operating member connected, via an intermediate linkage device to at least one fluid valve adapted, when open, to allow fluid from a pressure source to operate some only of said brakes, said intermediate linkage device also being connected to or including a piston which is movably disposed within a cylinder, relative movement between said piston and cylinder generating fluid pressure for the operation of the remaining brakes, which remaining brakes are operable only by the fluid pressure produced by the said relative movement.

A single pressure source may be adapted to deliver fluid to brakes associated with one pair of wheels of the vehicle through one fluid valve, said remaining brakes being associated with a further pair of wheels of the vehicle. Preferably a further pressure source is adapted to deliver fluid to brakes associated with both said pairs of wheels of the vehicle through a further fluid valve.

The piston and cylinder preferably define between them a pressure fluid reservoir which is fed with fluid through a first port and communicates with said remaining brakes through a second port, the arrangement being such that after an initial predetermined relative movement between said piston and cylinder, the first port is covered to prevent further passage of fluid therethrough, further relative movement forcing fluid under pressure through said second port to said remaining brakes.

In a preferred embodiment, the cylinder is fixed relative to the vehicle.

The or each fluid valve may have a valve actuating member projecting therefrom, the intermediate linkage device contacting the or each valve actuating member and said piston rod.

Preferably the intermediate linkage device includes a cross member connected by a pivot to a first link from said operating member, there being pivotally connected to said cross member on either side of said pivot, a second link to the piston rod, and a third link, between the or each valve actuating member and said cross member. The first link may also be pivoted to said operating member and said second link may be pivoted to the piston rod.

Preferably there are two fluid valves, the intermediate linkage device being so arranged that said third link which contacts both the valve actuating members is pivoted to said cross-member about a point disposed between the two valve actuating members.

The invention also provides a motor car provided with a hydraulic braking system set forth above.

The invention is illustrated, merely by way of example, in the accompanying drawings, in which:

FIGURE 1 illustrates diagrammatically a hydraulic braking system according to the present invention, FIGURE 2 shows to a greater scale, details of a valve assembly shown diagrammatically in FIGURE 1, and FIGURE 3 illustrates diagrammatically an alternative hydraulic braking system according to the present invention.

In the drawings, like reference numerals have been used for like components in all figures.

Referring to FIGURES 1 and 2 of the drawings, two front wheels of a car (not shown) are indicated generally at 1 and 2, and two rear wheels at 3 and 4. The two front wheels each have two hydraulic motors, which may be of the conventional piston-and-cylinder form for operating brakes which preferably are of the disc-and-caliper type, said motors being indicated at 1a, 1b and 2a, 2b respectively. The rear wheels 3, 4, each have two hydraulic motors for brake operation, indicated at 3a, 3b and 4a, 4b respectively.

Hydraulic fluid contained in a reservoir 5 is supplied by gravity through a pipe 6 to a pump 7, driven from a source of power, preferably the car engine (not shown), to deliver the fluid under pressure to a pipe 8 leading to a pressure-regulating valve 9 and hydraulic accumulator 10, thence via a pipe 14 to a control valve assembly 15. The valve 9 also functions as a relief valve allowing fluid to return to the reservoir 5 via a pipe 11 whenever the fluid pressure tends to become excessive i.e. when accumulator 10 is fully charged.

The control valve assembly 15 has an outlet connection to a pipe 17, the pipe 17 being connected to the hydraulic motors 1b, 2b of the front wheels of the car.

As shown particularly in FIG. 2, the control valve assembly 15 comprises a block with a central bore in which a valve member 16 is slidable, and at different positions along said bore there are disposed fluid connections to pipes 14, 17, already mentioned. A passage 19 within the block of the valve assembly 15 connects the outlet connection to pipe 17 to a chamber 20. The chamber 20 accommodates an enlarged head 21 on the valve member 16, a spring 22 between said head 21 and an end closure of the chamber 20 serving as a return spring normally maintaining the valve member 16 in a position permitting no fluid to pass between pipes 14 and 17. However, when said valve member 16 is operated so that it moves to the left (as shown in FIG. 2), a portion 18 of the valve member 16 having a reduced cross-section comes opposite the pipe 14, and fluid may flow between pipe 14 and pipe 17. Thus pressure fluid from the pump 7 and accumulator 10 may reach the brake-operating motors 1b, 2b, and also pressure fluid reaches the chamber 20 via the passage 19 and applies a thrust tending to return valve member 16 to the right. This thrust has to be opposed by a force applied to the right-hand end of the valve member 16, and it will be apparent therefore that, for any particular force applied to the right-hand end of the valve member 16, said valve member will adopt a position in which that force is balanced by the fluid pressure acting upon its other end, together with the force developed by the compression of the spring 22. As the fluid pressure acting upon the end of valve member 16 is the same pressure as is applied to the brake-operating motors 1b, 2b this arrangement secures that the pressure applied to the motors is related to the operating force applied to the valve member 16.

Whenever the valve member 16 is allowed to return to its closed, i.e., right-hand position, its portion 18 of reduced diameter ceases to be opposite the pipe 14 and therefore the supply of pressure fluid from the pump 7 and accumulator 10 is cut off, but said portion 18 of reduced diameter comes opposite a further connection to a pipe 23, whereby the pipe 17 is put in communication with the reservoir 5, so that pressure fluid returning from the hydraulic motors 1b, 2b as the brakes come off under the influence of their return springs may return to said reservoir 5.

The hydraulic motors 1a, 2a, 3a and 4a are connected to a further control valve assembly 31 which is mounted alongside the control valve assembly 15 and is exactly similar to control valve assembly 15, but is associated with its own fluid reservoir 26. The fluid reservoir 26 is connected by a pipe 25 to a pump 24, which delivers pressure fluid by a pipe 27 to a pressure regulating valve 28, accumulator 29, and thence through a pipe 30 to the control valve assembly 31. A pipe 41 corresponding to the pipe 11 is provided for return of fluid from the pressure regulating valve 28 to the reservoir 26 whenever valve 28 functions as a relief valve.

The control valve assembly 31 includes a valve member 32, similar to the valve member 16. The two control valve assemblies 15, 31 being mounted side by side the right-hand ends of the two valve members 16, 32 project parallel to one another so that they may be operated by a common member, namely, palate 33, which is pivoted at or adjacent its centre at 33a, to a projection on the end of a cylinder 35. An operating member in the form of a brake pedal 34 mounted in the usual manner in the car (not shown) is operatively connected to a piston 36 accommodated within the cylinder 35. A spring 37 normally keeps the piston 36 at the right-hand end of the cylinder 35 that is, keeps a pressure fluid reservoir 38 defined between them at a maximum. The reservoir 38, when the piston 36 is in its right-hand position, is supplied by gravity with hydraulic fluid from a reservoir 39, via a pipe 40. A pipe 43 leading to hydraulic motors 3b, 4b may receive fluid from the reservoir 38. The pipe 43 is connected to the left-hand end of the cylinder 35, and whenever the piston 36 moves to the left relative to cylinder 35, it first closes the opening through which fluid may enter the cylinder from the reservoir 39 and then causes the fluid in the reservoir 38 to be compressed.

In operation, when the brake pedal 34 is moved, the piston 36 moves relative to cylinder 35, thus forcing fluid under pressure through pipe 43 and thus actuating the brake-operating motors 3b, 4b. Also, cylinder 35 moves relative to control valve assemblies 15, 31, actuating valve members 16 and 32, and effecting operation of brake operating motors 1a, 1b, 2a, 2b, 3a, 4a. Thus, in normal operation both the "power operated" and "mechanically operated" brakes (i.e. those operated by motors 1a, 2a, 3a, 4a, 1b, 2b and 3b, 4b respectively) are used together.

Should either one of the power-operated systems fail, e.g., if the pump 7 or 24 ceases to generate the required pressure, then, upon operation of the brake pedal 34 and consequent movement of the palate 33 the latter tilts about its pivot 33a until the control valve member (16 or 32) of the "inoperative" system has moved through its full travel, whereafter further movement of the palate 33 is effective upon the control valve member of the system which remains operative so that power braking is still available. Then when the brake pedal 34 has been depressed so far that both control valve members 16, 32 have been moved through their full travel, further depression of the pedal 34 increases the braking effort by bringing the cylinder 35 into operation, pressure generated therein being effective on hydraulic motors 3b, 4b. Thus if either or both power-operated systems should fail, braking can still be effected although of course substantially greater pedal effort will be needed to obtain any given degree of retardation.

If there should be some failure in the cylinder 35 or its associated parts, e.g., a shortage of fluid there, then whenever the piston 36 moves to the left in cylinder 35, its range of movement is restricted by an abutment 44, so that the link between pedal 34 and palate 33 becomes solid to allow operation of valve members 16, 32, once piston 36 engages the abutment 44.

Referring now to FIGURE 3, there is disclosed an alternative embodiment of the hydraulic braking system according to the present invention. Much of this system is identical with that already described with reference to FIGURES 1 and 2, and it will not therefore be described in detail.

The main improvement of the system of FIGURE 3 concerns the cylinder 35, which instead of "floating" is fixed to the frame of the vehicle. Since cylinder 35 is not movable, it does not form part of an intermediate linkage device but is connected to another linkage device 51.

As seen in FIGURE 3, the right-hand ends of the two valve members 16, 32, are contacted by a common member, namely, a palate 33, which is pivoted at or adjacent its centre at 33a to a cross member 50 of the linkage device 51.

The operating member 34 is pivotally connected, by a link 52 to cross member 50, the link 52 being connected to cross member 50 by a pivot (or pin) 54. A link 53, connected to piston 36, is pivoted to cross member 50 on one side of pivot 54 and palate 33 is pivoted to cross member 50 at 33a on the opposite side of pivot 54. Pivot 33a is disposed between valve members 16 and 32. A link 55, pivoted to the vehicle frame at 56, is pivoted to the linkage device 51 at pivot 54. The link 55 maintains the linkage device 51 in a single plane (i.e., in the plane of FIGURE 3).

With the arrangement described operation of pedal 34 causes link 52 to move to the left (as seen in FIGURE 3), thus moving the cross-member 50 to the left. This forces piston 36 and valve members 16 and 32 to the left, thus causing pressure fluid to be fed to hydraulic motors 1a, 1b, 2a, 2b, 3a, 3b, 4a, 4b. Release of pedal 34 permits all brakes to be released, the valve members 16, 32 and piston 36, together with all components of linkage device 51, returning to their "rest" positions shown in FIGURE 3.

Should either one of the power-operated systems fail, e.g., the pump 7 or 24 ceases to generate the required pressure, then upon operation of the brake pedal 34 and consequent movement of the palate 33, the latter tilts about its pivot 33a until the control valve member 16 or 32 of the inoperative system has moved through its full travel, whereafter further movement of the palate 33 is effective upon the control valve member of the system which remains operative so that power braking is still available. When the brake padel is being depressed, further braking effort is available of course since the cylinder 35 is in operation, pressure generated therein being effective on hydraulic motors 3b, 4b. Thus if either or both power-operated systems should fail, braking can still be effected through cylinder 35 and motors 3b, 4b.

If there should be some failure in the cylinder 35 or its associated parts e.g. a shortage of fluid there, then when the piston 36 moves to the left in cylinder 35, its range of movement is restricted by an abutment 44, and further movement of pedal 34 pivots cross member 50 about link 53 and acts upon palate 33 in moving valve members 16 and 32 to the left. Thus power braking is still available.

Thus it will be seen that both braking systems which have been described in detail provide three independent sources of fluid pressure for operation of the brakes and three sets of hydraulic motors (1b, 2b, 1a, 2a, 3a, 4a, 3b, 4b.). Normally, brake operation is by all systems operating simultaneously, but if any one of these systems fails then the other system remain and if one of those also should fail, for example if both pumps are driven from the engine of the car and that becomes inoperative, then braking is still available by virtue of the third system, e.g., by hydraulic pressure which is automatically generated in the cylinder 35 whenever the brake pedal is operated. Furthermore, lack of fluid as a cause of faulty brake operation is rendered very unlikely, as three separate reservoirs are used, one for each of the pressure-generating devices.

It will be understood that various changes and modifications are possible without departure from the scope of the invention. The systems may be differently associated with the various wheels, for example all systems may have hydraulic motors associated with each wheel.

It is also within the scope of the invention to duplicate the cylinder 35 and associated parts in which event each cylinder would be secured to the valve of one of the power-operated systems and the palate or other device for dividing the applied effort between the valves would be arranged instead to operate the two pistons. Naturally, in this arrangement, or in the arrangements shown, the cylinder 35 and its piston may be reversed without effecting the operation thereof or other means for fluid pressure generation may be employed.

I claim:

1. A hydraulic brake system for a vehicle having first and second pairs of wheels comprising: a first set of hydraulically actuated brake applying motors, said first set of motors including at least one motor for each wheel of said first pair of wheels; a first fluid pressure source; a first fluid valve operatively connected to said first fluid pressure source and to each motor of said first set of motors, said first fluid valve being arranged, when open, to allow fluid from said first pressure source to actuate said first set of motors of the first pair of wheels; a second set of hydraulically actuated brake applying motors independent of said first set of motors, said second set of motors including at least one motor for each wheel of said first and second pairs of wheels; a second fluid pressure source; a second fluid valve operatively connected to said second pressure source and to each motor of said second set of motors, said second fluid valve being arranged, when open, to allow fluid from said second pressure source to actuate said second set of motors of said first and second pairs of wheels; an intermediate linkage; an operating member operatively connected by said intermediate linkage to said first and second fluid valves; a cylinder fixed relative to the vehicle; a piston movably disposed within said cylinder for generating fluid pressure, said piston being operatively associated with said intermediate linkage; a third set of hydraulically actuated brake applying motors independent of said first and second sets of motors, said third set of motors including at least one motor for each wheel of said second pair of wheels, said third set of motors being actuated by movement of said piston in said cylinder in a direction which generates fluid pressure.

2. A hydraulic brake system for a vehicle having first and second pairs of wheels comprising: a first set of hydraulically actuated brake applying motors, said first set of motors including at least one motor for each wheel of said first pair of wheels; a first fluid pressure source; a first fluid valve operatively connected to said first fluid pressure source and to each motor of said first set of motors, said first fluid valve being arranged, when open, to allow fluid from said first pressure source to actuate said first set of motors of the first pair of wheels; a second set of hydraulically actuated brake applying motors independent of said first set of motors, said second set of motors including at least one motor for each wheel of said first and second pairs of wheels; a second fluid pressure source; a second fluid valve operatively connected to said second pressure source and to each motor of said second set of motors, said second fluid valve being arranged, when open, to allow fluid from said second pressure source to actuate said second set of motors of said first and second pairs of wheels; a valve actuating member projecting from each of said first and second fluid valves; a cylinder fixed relative to the vehicle; a piston movably disposed within said cylinder for generating fluid pressure; a piston rod attached to said piston; an intermediate linkage operatively connected to said piston rod and to the valve actuating member of each of said first and second fluid valves; an operating member operatively connected to said intermediate linkage for actuating the same; a third set of hydraulically actuated brake applying motors independent of said first and second sets of motors, said third set of motors including at least one motor for each wheel of said second pair of wheels, said third set of motors being actuated by relative movement between said piston and cylinder which generates fluid pressure.

3. A hydraulic braking system for a vehicle having first and second pairs of wheels comprising: a first set of hydraulically actuated brake applying motors, said first set of motors including at least one motor for each wheel of said first pair of wheels; a first fluid pressure source, a first fluid valve operatively connected to said first fluid pressure source and to each motor of said first set of motors, said first fluid valve being arranged, when open, to allow fluid from said first pressure source to actuate said first set of motors of the first pair of wheels; a second set of hydraulically actuated brake applying motors independent of said first set of motors, said second set of motors including at least one motor for each wheel of said first and second pairs of wheels; a second fluid pressure source; a second fluid valve operatively connected to said second pressure source and to each motor of said second set of motors, said second fluid valve being arranged, when open, to allow fluid from said second pressure source to actuate said second set of motors of said first and second pairs of wheels; a valve actuating member projecting from each of said first and second fluid valves; a cylinder; a piston movably disposed within said cylinder for generating fluid pressure; a piston rod attached to said piston; an intermediate linkage comprising a cross member, and first, second and third links; an operating member attached to said first link, said first link being pivotally connected to said cross member, and said second and third links being pivotally connected to said cross member on either side of the pivotal connection of said first link, said second and third links being respectively connected to said piston rod and to said valve actuating members; a third set of hydraulically actuated brake applying motors independent of said first and second sets of motors, said third set of motors including at least one motor on each wheel of said second pair of wheels, said third set of motors being actuated by relative movement between said piston and said cylinder, which generates fluid pressure.

4. A braking system as claimed in claim 3 in which said first link is also pivoted to said operating member and in which said second link is said piston rod.

5. A braking system as claimed in claim 3 wherein said third link is pivotally connected to said cross member intermediate a point disposed between said valve actuating members.

References Cited by the Examiner

UNITED STATES PATENTS 2,995,218 8/1961 Penrod _____ 188—152.02
3,114,581 12/1963 Tuszynski _____ 303—2

FOREIGN PATENTS 1,285,674 1/1962 France.
714,724 12/1941 Germany.
216,858 1/1942 Switzerland.

BENJAMIN HERSH, *Primary Examiner.*

EUGENE G. BOTZ, *Examiner.*

M. S. SALES, *Assistant Examiner.*